US008599126B2

(12) United States Patent
Chang et al.

(10) Patent No.: US 8,599,126 B2
(45) Date of Patent: Dec. 3, 2013

(54) METHOD OF LOCAL DIMMING OF LIGHT SOURCE, LIGHT SOURCE APPARATUS FOR PERFORMING THE METHOD AND DISPLAY APPARATUS HAVING THE LIGHT SOURCE APPARATUS

(75) Inventors: Moon-Hwan Chang, Yongin-si (KR); Dong-Min Yeo, Daegu (KR); Gi-Cherl Kim, Yongin-si (KR)

(73) Assignee: Samsung Display Co., Ltd. (KR)

( * ) Notice: Subject to any disclaimer, the term of this patent is extended or adjusted under 35 U.S.C. 154(b) by 919 days.

(21) Appl. No.: 12/409,879

(22) Filed: Mar. 24, 2009

(65) Prior Publication Data

US 2009/0303171 A1 Dec. 10, 2009

(30) Foreign Application Priority Data

Jun. 4, 2008 (KR) ............................ 2008-0052366

(51) Int. Cl.

| | |
|---|---|
| ***G09G 3/36*** | (2006.01) |
| ***G09G 5/10*** | (2006.01) |
| ***F21V 7/04*** | (2006.01) |
| ***G02F 1/1335*** | (2006.01) |

(52) U.S. Cl.

USPC .............. 345/102; 345/690; 362/600; 349/61

(58) Field of Classification Search

USPC ................ 345/690, 102; 349/61–71; 362/600

See application file for complete search history.

(56) References Cited

U.S. PATENT DOCUMENTS

| | | | | |
|---|---|---|---|---|
| 2006/0103621 | A1* | 5/2006 | Feng | 345/102 |
| 2009/0109165 | A1* | 4/2009 | Park et al. | 345/102 |

FOREIGN PATENT DOCUMENTS

| | | | | |
|---|---|---|---|---|
| JP | 2007322942 | A | | 12/2007 |
| KR | 1020070002313 | A | | 1/2007 |
| KR | 20080015679 | A | * | 2/2008 |
| KR | 1020080015679 | A | | 2/2008 |

* cited by examiner

*Primary Examiner* — Ilana Spar

(74) *Attorney, Agent, or Firm* — Cantor Colburn LLP

(57) ABSTRACT

In a method of local dimming of a light source including a plurality of light-emitting blocks, a dimming level of each light-emitting block of the plurality of light-emitting blocks is determined. A compensation dimming level of a predetermined light-emitting block is calculated based on dimming levels of peripheral light-emitting blocks disposed around a periphery of the predetermined light-emitting block. The predetermined light-emitting block is driven based on the compensation dimming level.

18 Claims, 8 Drawing Sheets

FIG.2

200

| | | | | | | | | | |
|---|---|---|---|---|---|---|---|---|---|
| B1 | B2 | B3 | B4 | B5 | B6 | B7 | B8 | B9 | B10 |
| B11 | B12 | B13 | B14 | B15 | B16 | B17 | B18 | B19 | B20 |
| B21 | B22 | B23 | B24 | B25 | B26 | B27 | B28 | B29 | B30 |
| B31 | B32 | B33 | B34 | B35 | B36 | B37 | B38 | B39 | B40 |
| B41 | B42 | B43 | B44 | B45 | B46 | B47 | B48 | B49 | B50 |
| B51 | B52 | B53 | B54 | B55 | B56 | B57 | B58 | B59 | B60 |
| B61 | B62 | B63 | B64 | B65 | B66 | B67 | B68 | B69 | B70 |
| B71 | B72 | B73 | B74 | B75 | B76 | B77 | B78 | B79 | B80 |

LxL LINEAR BLOCK WINDOW

LINEAR BLOCK WINDOW

LxL NON-LINEAR BLOCK WINDOW

NON-LINEAR BLOCK WINDOW

METHOD OF LOCAL DIMMING OF LIGHT SOURCE, LIGHT SOURCE APPARATUS FOR PERFORMING THE METHOD AND DISPLAY APPARATUS HAVING THE LIGHT SOURCE APPARATUS

This application claims priority to Korean Patent Application No. 2008-52366, filed on Jun. 4, 2008, and all the benefits accruing therefrom under 35 U.S.C. §119, the contents of which in its entirety are herein incorporated by reference.

BACKGROUND OF THE INVENTION

1. Field of the Invention

The present invention relates to a method of local dimming of a light source, a light source apparatus for performing the method, and a display apparatus having the light source apparatus. More particularly, the present invention relates to a method of local dimming of a light source which includes driving the light source, which includes a plurality of light-emitting blocks, by individually driving light-emitting blocks of the plurality of light-emitting blocks, a light source apparatus for performing the method, and a display apparatus having the light source apparatus.

2. Description of the Related Art

Generally, a liquid crystal display ("LCD") apparatus includes an LCD panel which displays an image by varying an optical transmittance of liquid crystal molecules disposed in the LCD panel. A backlight assembly is typically disposed below the LCD panel to provide the LCD panel with light.

The LCD panel typically includes an array substrate, a color filter substrate and a liquid crystal layer disposed therebetween. The array substrate typically includes a plurality of pixel electrodes and a plurality of thin-film transistors ("TFTs"). TFTs of the plurality of TFTS are electrically connected to pixel electrodes of the plurality of pixel electrodes. The color filter substrate is disposed opposite to, e.g., facing, the array substrate and has a common electrode and a plurality of color filters disposed thereon. The liquid crystal layer includes the liquid crystal molecules and is interposed between the array substrate and the color filter substrate.

When an electric field, generated between the pixel electrodes and the common electrode, is applied to the liquid crystal layer, an arrangement of the liquid crystal molecules of the liquid crystal layer is altered to change an optical transmissivity thereof. As a result, a desired image is displayed. Typically, the LCD panel displays a white image having a high luminance when an optical transmittance is maximum, and the LCD panel displays a black image having a low luminance when the optical transmittance is minimum.

However, the liquid crystal layer is difficult to arrange in a uniform direction, and light leakage is thereby generated when the LCD panel displays an image corresponding to a low gradation, for example. Specifically, it is difficult for the LCD panel to display a fully black image at a low gradation, and a contrast ratio ("CR") of the image displayed on the LCD panel is thereby degraded, e.g., decreases.

To prevent the contrast ratio of the image from decreasing, a method of local dimming of a light source has been developed. In the method, a light source is driven to individually control amounts of light according to a position in the LCD panel. In the method of local dimming of the light source, the light source is typically divided into a plurality of light-emitting blocks to control the amounts of light of each of the light-emitting blocks of the plurality of light-emitting blocks based on locations of relatively dark and light areas in a display area of the LCD panel. For example, a light-emitting block corresponding to a display area displaying a black image is driven at a low luminance (e.g., is turned off), while a light-emitting block corresponding to a display area displaying a white image is driven at a high luminance.

However, even though the light source is driven by light-emitting blocks according to an image displayed on the LCD panel, display defects, such as light leakage and flicker, for example, are generated. For example, when a given light-emitting block is lighted and peripheral light-emitting blocks disposed around a periphery of the given light-emitting block are not lighted, light leakage is generated in the LCD panel near the given light-emitting block, and a fully black image is not displayed. Moreover, when the LCD panel displays a moving image, positions of lighted light-emitting blocks rapidly move, and flicker is generated in the LCD panel.

BRIEF SUMMARY OF THE INVENTION

Exemplary embodiments of the present invention provide a method of local dimming of a light source having substantially enhanced display quality Exemplary embodiments of the present invention also provide a light source apparatus for performing the method.

Exemplary embodiments of the present invention further provide a display apparatus having the light source apparatus.

According to an exemplary embodiment of the present invention, a method of local dimming of a light source includes driving a light source including a plurality of light-emitting blocks by individually driving the light-emitting blocks. In the method, a dimming level of each light-emitting block of the plurality of light-emitting blocks is determined. A compensation dimming level of a predetermined light-emitting block of the light-emitting blocks is calculated based dimming levels of peripheral light-emitting blocks disposed around a periphery of the predetermined light-emitting block. The predetermined light-emitting block is driven based on the compensation dimming level.

According to an alternative exemplary embodiment of the present invention, a light source apparatus includes a light source module and a local dimming driving part. The light source module includes a plurality of light-emitting blocks. The local dimming driving part calculates a compensation dimming level of a predetermined light-emitting block of the plurality of light-emitting blocks based on dimming levels of peripheral light-emitting blocks of the plurality of light-emitting blocks disposed around a periphery of the predetermined light-emitting block, and drives the predetermined light-emitting block based on the compensation dimming level.

According to still another alternative exemplary embodiment of the present invention, a display apparatus includes a display panel, a light source module and a local dimming driving part. The display panel includes a plurality of display blocks and displays images thereon. The light source module includes a plurality of light-emitting blocks. Light-emitting block of the plurality of light-emitting blocks correspond to display blocks of the plurality of display blocks. Each light-emitting block includes a plurality of light-emitting diodes. The local dimming driving part calculates a compensation dimming level of a predetermined light-emitting block based on dimming levels of peripheral light-emitting blocks disposed around a periphery of the predetermined light-emitting block, and drives the predetermined light-emitting block based on the compensation dimming level.

Thus, according to exemplary embodiments of the present invention, a dimming level of a light-emitting block is compensated by using dimming levels of peripheral light-emitting blocks positioned in a peripheral area with respect to the light-emitting block, and a display quality of a display apparatus is thereby substantially enhanced.

BRIEF DESCRIPTION OF THE DRAWINGS

The above and other aspects, features and advantages of the present invention will become more readily apparent by describing in further detail exemplary embodiments thereof with reference to the accompanying drawings, in which:

FIG. 2 is a plan view of an exemplary embodiment of a light source module of the display apparatus of to the exemplary embodiment of the present invention shown in FIG. 1;

DETAILED DESCRIPTION OF THE INVENTION

Figure 1:
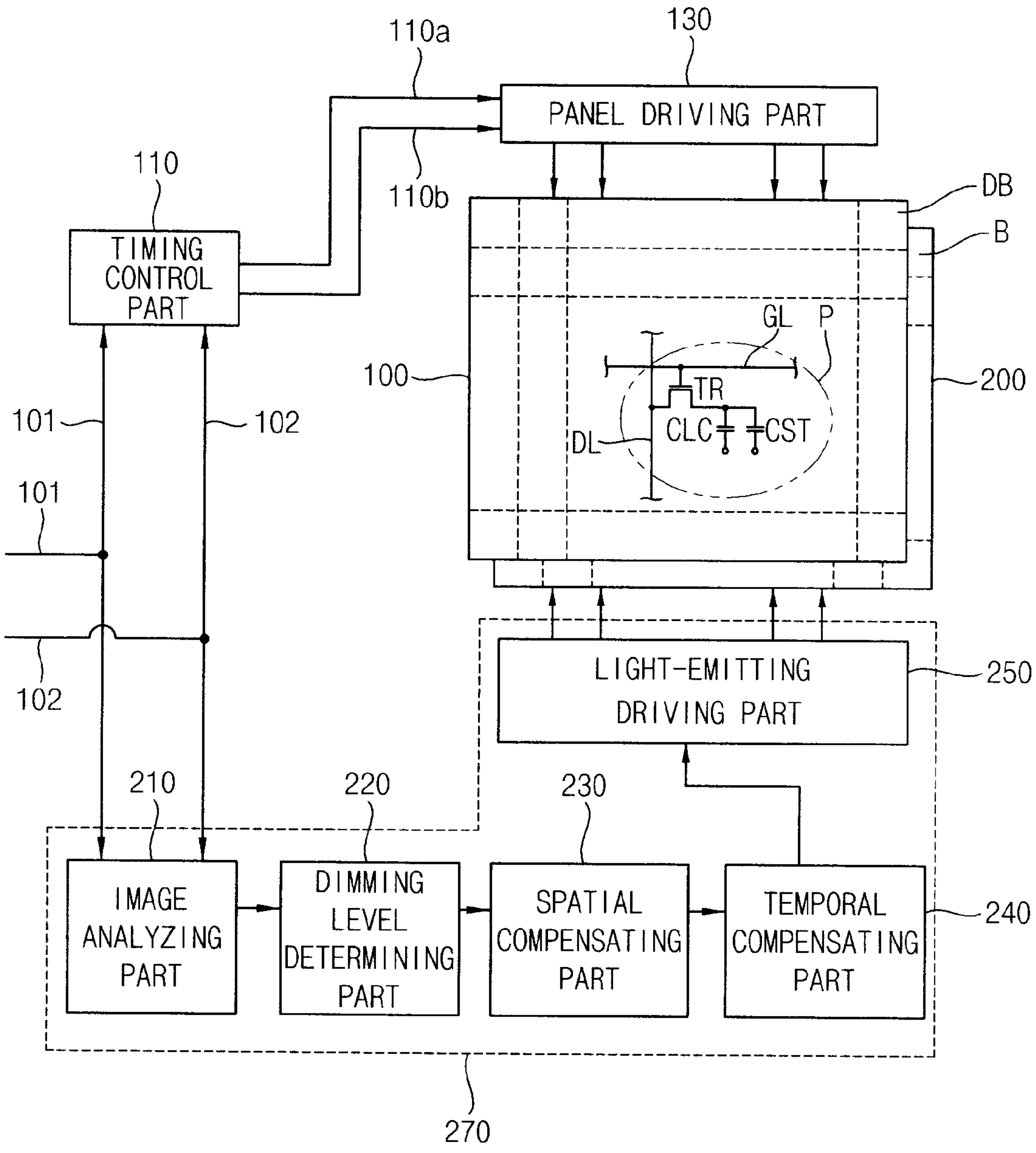
FIG. 1 is a block diagram of an exemplary embodiment of a display apparatus according to the present invention.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, the exemplary embodiments of the present invention will be described in further detail with reference to the accompanying drawings.

FIG. 1 is a block diagram illustrating an exemplary embodiment of a display apparatus according to the present invention. FIG. 2 is a plan view of an exemplary embodiment of a light source module of the display apparatus according to the exemplary embodiment of the present invention shown in FIG. 1.

Referring to FIGS. 1 and 2, a display apparatus according to an exemplary embodiment includes a display panel 100, a timing control part 110, a panel driving part 130, a light source module 200 and a local dimming driving part 270.

The display panel 100 includes a plurality of pixels P which display an image. In an exemplary embodiment of the present invention, for example, a number of pixels P of the plurality of pixels P may be M×N (wherein M and N are natural numbers). In addition, each pixel P includes a switching element TR connected to a gate line GL and a data line DL, a liquid crystal capacitor CLC and a storage capacitor CST each connected to the switching element TR. The display panel 100 further includes a plurality of display blocks DB. In an exemplary embodiment, for example, the display panel 100 may include m×n display blocks DB of the plurality of display blocks DB (wherein m and n are natural numbers, m<M and n<N).

The timing control part 110 receives a control signal 101 and an image signal 102 from an external source, e.g., an external device (not shown). The timing control part 110 generates a timing control signal 110*a* which controls a driving timing of the display panel 100 based on the control signal received by the timing control part 110. In an exemplary embodiment, the timing control signal includes a clock signal, a horizontal start signal and a vertical start signal, for example, but alternative exemplary embodiments are not limited thereto.

The panel driving part 130 drives the display panel 100 based on the timing control signal 110*a* provided from the timing control part 110 and an image control signal 110*b*. In an exemplary embodiment of the present invention, the panel driving part 130 includes a gate driving part (not shown) and a data driving part (not shown). The gate driving part generates a gate signal based on the timing control signal, and provides the gate line GL with the gate signal. The data driving part generates a data signal based on the timing control signal 110*a* and the image control signal 110*b*, and provides the data line DL with the data signal.

The light source module 200 according to an exemplary embodiment includes a printed circuit board ("PCB") including a plurality of light-emitting diodes ("LEDs") mounted thereon. More specifically, in an exemplary embodiment of the present invention, LEDs of the plurality of LEDs may include a red LED which generates red light, a green LED which generates green light and a blue LED which generates blue light. Alternatively, the LEDs may include a white LED which generates a white light. The light source module 200 according to an exemplary embodiment may include m×n light-emitting blocks B which correspond to the m×n display blocks DB. More particularly the light-emitting blocks B are disposed in positions corresponding to each of the display blocks DB. Each of the light-emitting blocks B includes a plurality of the LEDs. In an exemplary embodiment of the present invention, the light source module 200 may include 10×8 light-emitting blocks B1, B2, . . . , B79 and B80, as illustrated in FIG. 2.

Still referring to FIG. 1, the local dimming driving part 270 includes an image analyzing part 210, a dimming level determining part 220, a spatial compensating part 230, a temporal compensating part 240 and a light-emitting driving part 250.

The image analyzing part 210 analyzes a luminance of the image signal 102 based on the control signal 101 and the image signal 102 provided from an external device (not shown). In an exemplary embodiment, for example, the image analyzing part 210 analyzes one image signal 102 per frame, and extracts a representative luminance value of the display blocks DB corresponding to respective light-emitting block B.

Specifically, the dimming level determining part 220 determines a dimming level which controls a brightness of each of the light-emitting blocks B based on a representative luminance value of each of the light-emitting blocks B. For example, when a representative luminance value is higher than a predetermined value, the dimming level determining part 220 increases the dimming level associated with a corresponding light-emitting block B. Conversely, when a representative luminance value is lower than the predetermined value, the dimming level determining part 220 decreases the dimming level associated with the corresponding light-emitting block B.

The spatial compensating part 230 compensates a brightness of the light-emitting blocks B based on the dimming level to provide a spatially smoothed brightness profile. Specifically, the spatial compensating part 230 calculates a compensation dimming level of a given light-emitting block based on dimming levels of light-emitting blocks B positioned in a peripheral area of the given light-emitting block B, e.g., light-emitting blocks B positioned around the given light-emitting block B. In an exemplary embodiment, the compensation dimming level may be calculated by employing a linear spatial algorithm or, alternatively, a non-linear spatial algorithm. As will be described in greater detail below, in the linear spatial algorithm, a compensation dimming level is calculated using an average dimming level of the peripheral light-emitting blocks B positioned in the peripheral area of the given light-emitting block B. In the non-linear spatial algorithm, a compensation dimming level is calculated by employing a distance-weighted value to the dimming levels of the peripheral light-emitting blocks B positioned in the peripheral area of the given light-emitting block B.

The temporal compensating part 240 compensates the brightness of the light-emitting blocks B based on the dimming level to provide a temporally smooth brightness profile. The temporal compensating part 240 compensates a dimming level of a previous frame based on a dimming level of a previous frame and a dimming level of a current frame. A temporal algorithm is employed in the temporal compensating part 240, and a function thereof is defined in Equation 1.

$$Dt_j(i) = Dt_{j-1}(i) + r \times \{Ds_j(i) - Dt_{j-1}(i)\}$$

$$r = \mathrm{Min}\left\{1,\ a + \frac{\overline{G_j} - \overline{G_{j-1}}}{G\mathrm{max}}\right\}$$

Equation 1

In Equation 1, $Dt_j(i)$ represents a dimming level temporally compensated with respect to an (i)-th light-emitting block of a current frame (wherein 'i' and 'j' are natural numbers), $Ds_j(i)$ represents a dimming level compensated by the spatial compensating part 230 with respect to the (i)-th light-emitting block of the current frame, and $Dt_{j-1}(i)$ represents a dimming level temporally compensated with respect to the (i)-th light-emitting block of the current frame. The parameter a (of $0<a<1$, $\overline{G_j}$) is an average gradation value of the current frame, $\overline{G_{j-1}}$ is an average gradation value, and $G_{max}$ is a maximum gradation value of a total gradation range of an image signal.

Referring to Equation 1, as a difference between a current frame average gradation value $\overline{G_j}$ and a previous frame average gradation value $\overline{G_{j-1}}$ increases, a parameter r becomes closer to a value of 1. As the difference between the current frame average gradation value $\overline{G_j}$ and a previous frame average gradation value $\overline{G_{j-1}}$ decreases, r becomes closer to a. As the difference between a current frame average gradation value $\overline{G_j}$ and the previous frame average gradation value $\overline{G_{j-1}}$ increases, the temporal compensation dimming level $Dt_j(i)$ of the (i)-th light-emitting block becomes closer to the dimming level $Ds_j(i)$ compensated by the spatial compensating part 230. Conversely, as the difference between the current frame average gradation value $\overline{G_j}$ and the previous frame average gradation value $\overline{G_{j-1}}$ decreases, the temporal compensation dimming level $Dt_j(i)$ of the (i)-th light-emitting block becomes closer to a temporal compensation dimming level dimming level $Dt_j(i)$ for the (i)-th light-emitting block of the previous frame.

The light-emitting driving part 250 generates a plurality of driving signals which drive the light-emitting blocks B based on the compensation dimming levels compensated by the spatial compensating part 230 and/or the temporal compensating part 240. In an exemplary embodiment, the driving signals may include a plurality of pulse width modulation ("PWM") signals. The driving signals correspond to the light-emitting blocks B, and the light-emitting blocks B are driven by the driving signals to each have a brightness corresponding to a luminance of the image signal 102. Put another way, the light source module 200 is driven using a local dimming method.

Figure 3:
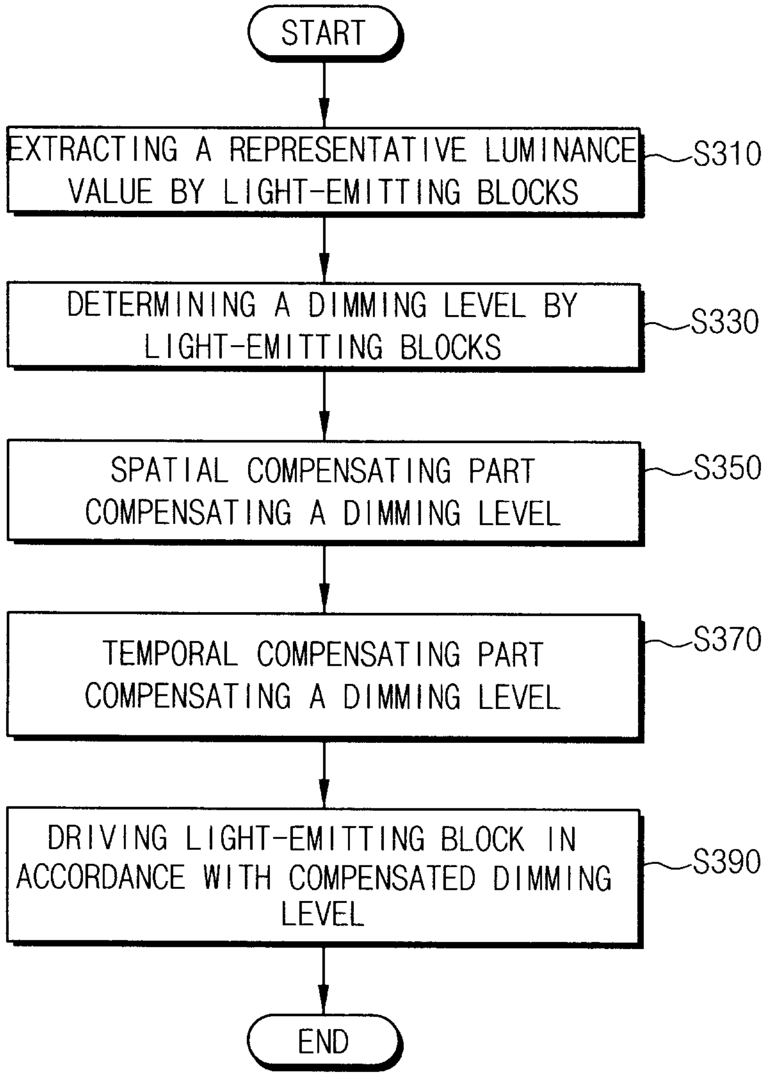
FIG. 3 is a flowchart showing an exemplary embodiment of a method of driving a local dimming driving part of the display apparatus according to the exemplary embodiment of the present invention shown in FIG. 1.

FIG. 3 is a flowchart showing an exemplary embodiment of a method of driving a local dimming driving part of the display apparatus according to the exemplary embodiment of the present invention shown in FIG. 1.

Referring to FIGS. 1 and 3, the image analyzing part 210 analyzes a gradation for an image signal 102 of a frame unit received from an external device (not shown) and extracts a plurality of representative luminance values corresponding to each of the light-emitting blocks B (step S310).

The dimming level determining part 220 determines a dimming level which controls a brightness of a given light-emitting block B based on the representative luminance value (step S330).

The spatial compensating part 230 compensates a dimming level of the given light-emitting block B based on a dimming level of peripheral light-emitting blocks B positioned in a peripheral area of the given light-emitting block B (step S350). In an exemplary embodiment, the compensated dimming level may have a smoothing profile with respect to a dimming level of the peripheral light-emitting blocks B.

The temporal compensating part 240 compensates a dimming level of a current frame by using a dimming level of a previous frame (step S370). More specifically, as described above with reference to Equation 1, as a difference between the current frame average value and the previous frame gradation value increases, the temporal compensating part 240 compensates a dimming level similar to the compensation dimming level outputted to the spatial compensating part 230. As the difference between the current frame average value and the previous frame gradation value decreases, the temporal compensating part 240 compensates a dimming level similar to the previous frame dimming level.

The light-emitting driving part 250 provides the light source module 200 with the plurality of driving signals to individually, e.g., locally, drive each of the light-emitting blocks B based on a dimming level which is spatially and/or temporally compensated (step S390). Thus, the light-emitting blocks B of the light source module 200 are driven using the local dimming method.

Hereinafter, a linear spatial algorithm will be described in further detail with reference to FIGS. 4A to 5B.

Figure 4A:
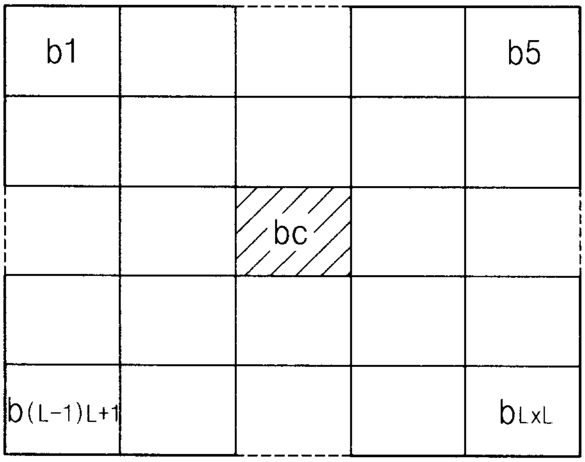
FIGS. 4A and 4B are plan views showing an exemplary embodiment of a linear block window employed in a spatial compensating part according to the present invention.
Figure 4B:
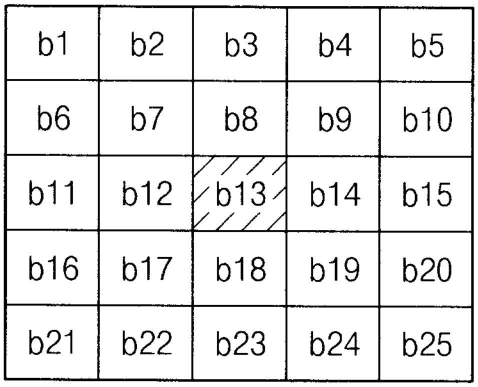

FIGS. 4A and 4B are plan views illustrating an exemplary embodiment of a linear block window ("LBW") employed in a spatial compensating part according to the present invention.

Referring to FIGS. 2 and 4A, the linear block window is defined as blocks b of L×L (wherein L is a natural number, L<m and L<n), and a central block bc positioned at, e.g., disposed at, a central area of the linear block window and which corresponds to a given light-emitting block B to be compensated. Hereinafter, for purposes of explanation, light-emitting blocks b described with reference to a linear block window will be labeled with a lower case "b" while light-emitting blocks B described with reference to the plurality of light-emitting blocks B (FIGS. 1 and 2) will be denoted with an upper case "B" It will be noted, however, that the light-emitting blocks b are substantially the same as corresponding light-emitting blocks B, and differences in notation thereof is made only for purposes of clarification in describing exemplary embodiments of the present invention herein. The linear spatial algorithm which employs the linear block window is defined by Equation 2.

$$Ds(c) = D(c) + k(\overline{D} - D(c));\ 0 \le k \le 1, \qquad \text{Equation 2}$$

$$\overline{D} = \frac{\sum_{i=1, i \ne c}^{L \times L} D(i)}{(L \times L) - 1}$$

In Equation 2, Ds(c) represents a compensation dimming level of a light-emitting block B corresponding to the central block bc compensated by the linear spatial algorithm, and D(c) represents a dimming level of the light-emitting block B. $\overline{D}$ represents an average dimming level of peripheral blocks of the central block bc.

In an exemplary embodiment, as shown in FIG. 4B, when a 5×5 linear block window of is employed, for example, the central block bc is a (13)-th block b13 positioned at a central position of the 5×5 linear block window is a light-emitting block B (FIG. 1), and the peripheral blocks b1, . . . , b12, b14, . . . , b25 correspond to the peripheral light-emitting blocks B of the light-emitting block B to be compensated. In an exemplary embodiment, a compensation dimming level of the light-emitting block B corresponding to the (13)-th block b13 (e.g., the central block bc) is defined by Equation 3.

$$Ds(13) = D(13) + k(\overline{D} - D(13));\ 0 \le k \le 1, \qquad \text{Equation 3}$$

$$\overline{D} = \frac{\sum_{i=1, i \ne 13}^{25} D(i)}{24}$$

In Equation 3, Ds(13) represents a compensation dimming level of the light-emitting block B corresponding to the (13)-th blocks b13 (e.g., the central block bc), and D(13) represents a dimming level of the corresponding light-emitting block B (FIG. 1). $\overline{D}$ represents an average dimming level of the peripheral light-emitting blocks B (e.g., the peripheral blocks b1, . . . , b12, b14, . . . , b25).

Thus, based on Equation 2 and Equation 3, a compensation dimming level of a light-emitting block B is a value obtained by adding a self-dimming level to a constant k based on a difference between an average dimming level of the peripheral light-emitting blocks B and a predetermined self-dimming level. As shown in FIG. 2, when the light source module 200 according to an exemplary embodiment of the present invention includes 80 light-emitting blocks B, Equation 2 is repeated at least 80 times per frame to calculate a compensation dimming level of each of 80 light-emitting blocks B.

Figure 5A:
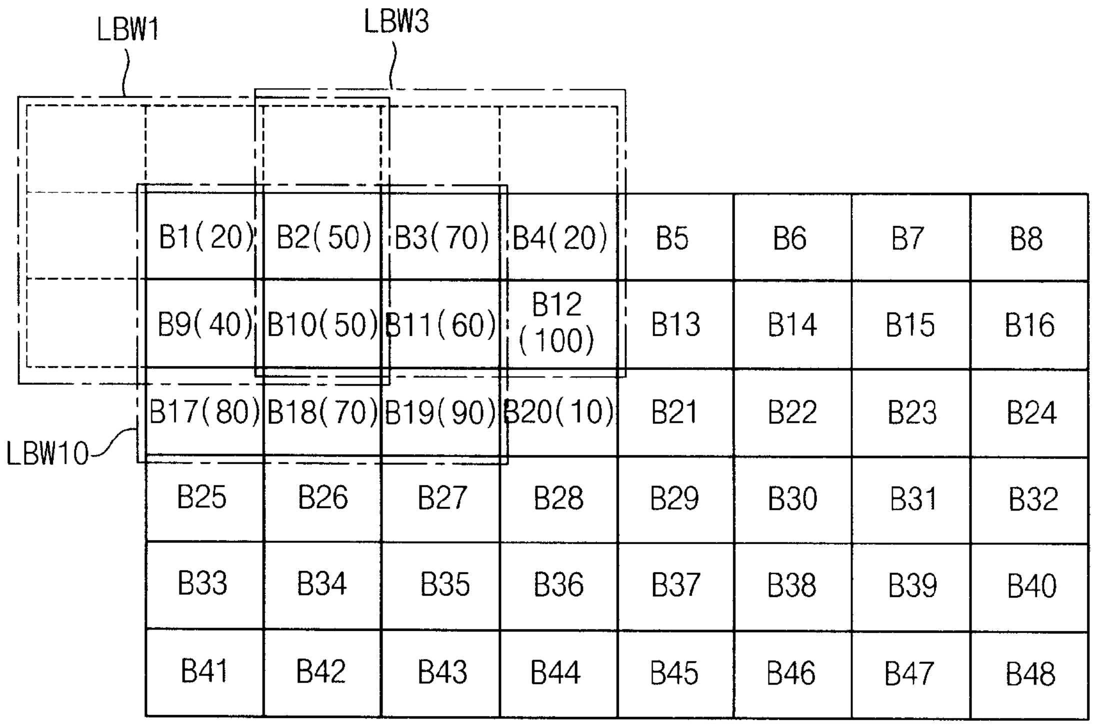
FIGS. 5A and 5B are plan views illustrating an exemplary embodiment a linear spatial algorithm using a linear block window according to the present invention.
Figure 5B:
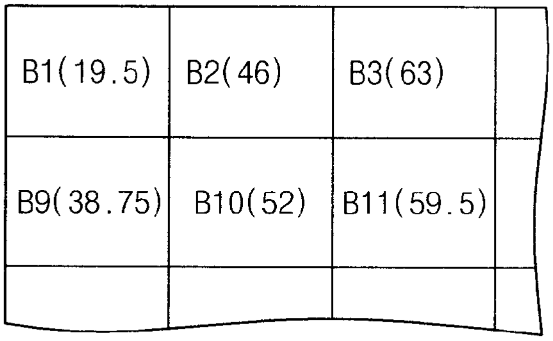

FIGS. 5A and 5B are plan views of illustrating an exemplary embodiment of a linear spatial algorithm using a linear block window of a display apparatus according to the present invention. In FIGS. 5A and 5B, a process for calculating compensation dimming levels of light-emitting blocks B is shown, in which a linear block window of 3×3 light-emitting blocks B is employed in a light source module 200 including of 8×6 light-emitting blocks B.

Referring to FIGS. 5A and 5B, a first linear block window LBW1 is employed to calculate a compensation dimming block of a first light-emitting block B1. As shown in FIG. 5A, the first light-emitting block B 1 is positioned at an outermost peripheral area of the light source module 200, and peripheral light-emitting blocks B defined by the first linear block window LBW1 are second, ninth and tenth light-emitting blocks B2, B9 and B10, respectively. A compensation dimming level of the first light-emitting block B1 is calculated using Equation 2 to be, for example, 20+k(17.5−20)=19.5. For purposes of illustration here, k is assumed to be equal to approximately 0.2.

Similarly, a third linear block window LBW3 is employed to calculate a compensation dimming block of a third light-emitting block B3. According to the third light-emitting block B3, peripheral light-emitting blocks defined by the third linear block window LBW3 are second, fourth, tenth, eleventh and twelfth light-emitting blocks B2, B4, B10, B11 and B12, respectively. A compensation dimming level of the third light-emitting block B3 is calculated using Equation 2 to be 70+0.2(35−70)=63, for example.

A tenth linear block window LBW10 is employed to calculate a compensation dimming block of a tenth light-emitting block B10. With respect to the tenth light-emitting block B10, peripheral light-emitting blocks to the tenth light-emitting block B10 are first, second, third, ninth, eleventh, seventeenth, eighteenth and nineteenth light-emitting blocks B1, B2, B3, B9, B11, B17, B18 and B19, respectively. Using Equation 2, a compensation dimming level of the tenth light-emitting block B10 is calculated to be, for example, 50+0.2(60−50)=52.

By repeating the above-described process, a compensation dimming level for each of a total of 48 light-emitting blocks B1, B2, . . . , B47 and B48 is calculated.

Hereinafter, a linear spatial algorithm will be described in further detail with reference to FIGS. 6 to 7C.

Figure 6A:
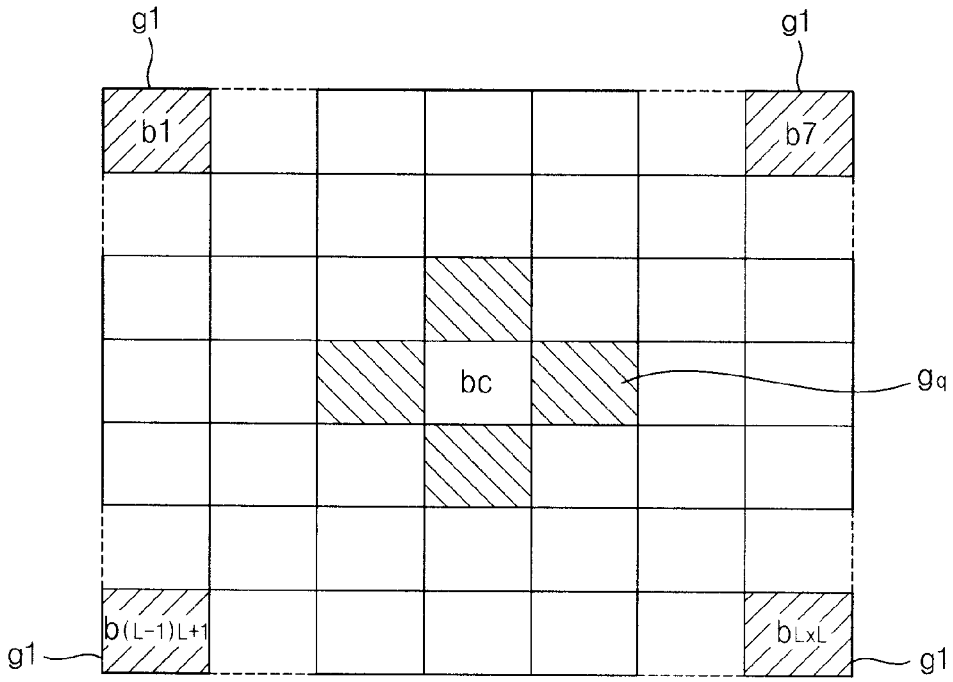
FIGS. 6A and 6B are plan views showing an exemplary embodiment of a nonlinear block window employed in a spatial compensating part according to the present invention.
Figure 6B:
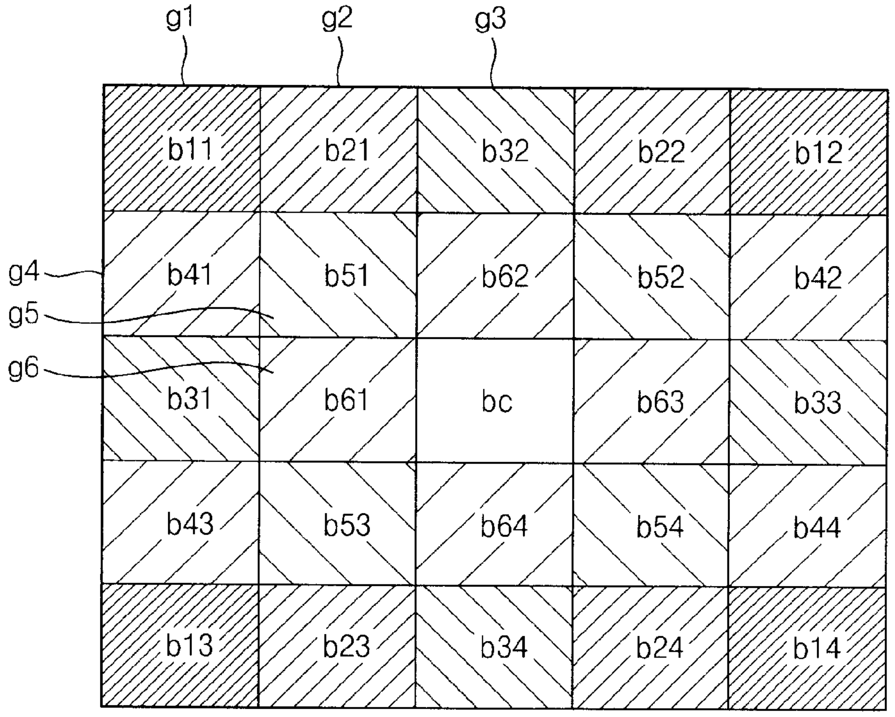

FIGS. 6A and 6B are plan views illustrating an exemplary embodiment of a nonlinear block window ("NLBW") employed in a spatial compensating part according to the present invention.

Referring to FIGS. 2 and 6A, the nonlinear block window is defined as L×L blocks b of (wherein L is a natural number, L<m and L<n), and a central block bc of the nonlinear block window is a light-emitting block B for compensating. In an exemplary embodiment, for example, L is an odd number greater than 1.

The nonlinear spatial algorithm divides the L×L blocks of with q number of groups (wherein q is a natural number) positioned at a predetermined portion of a nonlinear block window in accordance with a distance from the central block bc. Specifically, q is $$\frac{L^2-1}{4}.$$

Thus, a first group g1 includes, for example, blocks positioned at a farthest distance from the central block bc, and a (q)-th group gq includes blocks b positioned at a nearest distance from the central block bc, e.g., blocks b1, b7, $b_{(L-1)L+1}$ (b43) and $b_{L\times L}$ (b49). Each group includes four blocks b positioned at upper, lower, left and right portions with respect to the central block bc, as shown in FIG. 6A.

The light-emitting block B corresponding to the central block bc is calculated by using a dimming level of peripheral light-emitting blocks corresponding to blocks peripheral to the central block bc, e.g., blocks of a first to (q)-th group.

A nonlinear spatial algorithm employing a nonlinear block window of L×L according to an exemplary embodiment of the present invention is defined by Equation 4 and Equation 5.

$$T_1=\omega_1\times D(g_1)\text{max},\qquad \text{Equation 4}$$

$$T_2=\omega_2\times D(g_2)\text{max},$$

$$\ldots$$

$$T_Q=\omega_Q\times D(g_Q)\text{max},$$

$$Tc=D(c)$$

In Equation 4, D(g1)max represents a maximum dimming level of light-emitting blocks b corresponding to a first group g1, D(g2)max represents a maximum dimming level of light-emitting blocks b corresponding to a second group g2, D(gq) max represents a maximum dimming level of light-emitting blocks b corresponding to a (q)-th group gq, and w1, w2, . . . , wq represent a distance-weighted value defined as 0<w1<w2< . . . wq<1.

According to Equation 4, a distance-weighted value corresponding to a maximum dimming level for each group is employed, and adaptation levels T1, . . . , Tq of each group are thereby calculated. An adaptation level of the central block bc is a dimming level D(c) of the light-emitting block.

$$Dns(c)=\text{Max}\{T_1,T_2,\ldots,T_Q,T_C\}$$

According to Equation 5, a compensation dimming level Dns(c) of the light-emitting block B is a maximum value from among the adaptation levels T1, T2, . . . , Tq of the first to (q)-th groups and a dimming level Tc of the light-emitting block B corresponding to the central block bc.

According to Equations 4 and 5, a compensation dimming level Dns(c) of a light-emitting block B according to the nonlinear spatial algorithm is the maximum value among a dimming C(c) of the light-emitting block B and adaptation levels T1, . . . , Tq which a distance-weighted value is employed in a dimming level of peripheral light-emitting blocks. In an exemplary embodiment, when the light source module 200 includes 80 light-emitting blocks B, as shown in FIG. 2, Equation 4 and Equation 5 are each repeated at least 80 times per frame to calculate a compensation dimming level of each of the 80 light-emitting blocks B.

Referring now to FIG. 6B, when a 5×5 nonlinear block window is employed, a central block bc is a light-emitting block to be compensated and peripheral blocks which correspond to peripheral light-emitting blocks of the light-emitting block B. When a size L of the nonlinear block window is 5, the peripheral blocks may be divided into a first group g1, a second group g2, a third group g3, a fourth group g4, a fifth group g5 and a sixth group g6. Specifically, the first group g1 includes the farthest blocks b11, b12, b13 and b14 from the central block bc, the second group g2 includes blocks b21, b22, b23 and b24, and the third group g3 includes blocks b31, b32, b33 and b34. The fourth group g4 includes blocks b41, b42, b43 and b44, the fifth group g5 includes blocks b51, b52, b53 and b54, and the sixth group g6 includes the nearest blocks b61, b62, b63 and b64 from the central block bc, as shown in FIG. 6B.

A nonlinear spatial algorithm employing the 5×5 nonlinear block window is defined by Equation 6 (with reference to Equation 4, described in greater detail above).

$$T_1=\omega_1\times\mathrm{Max}\{D((g_1(1)),D((g_1(2)),D((g_1(3)),D((g_1(4))\}\quad\text{Equation 6}$$

$$T_6=\omega_2\times\mathrm{Max}\{D((g_2(1)),D((g_2(2)),D((g_2(3)),D((g_2(4))\}$$

$$\ldots$$

$$T_6=\omega_6\times\mathrm{Max}\{D((g_6(1)),D((g_6(2)),D((g_6(3)),D((g_6(4))\}$$

$$T_c=D(c)$$

In Equation 6, D(g1(1)) represents a dimming level of the first block b11 included in the first group g1, and D(c) represents a dimming level of a light-emitting block B (FIG. 2) corresponding to the central block bc. In an exemplary embodiment, the distance-weighted value may be defined as 0<w1<w2<w3<w4<w5<w6<1.

According to Equation 6, a distance-weighted value corresponding to the maximum dimming level among dimming levels of peripheral light-emitting blocks corresponding to blocks of each group is employed, and adaptation levels of each group are thereby calculated. A compensation dimming level Dns(c) of the light-emitting block B is calculated using adaptation levels T1, T2, . . . , T6 of the calculated first to sixth groups and a dimming level D(c) of the light-emitting block B with reference Equation 5. A compensation dimming level Dns(c) of the light-emitting block B according to an exemplary embodiment is defined by Equation 7.

$$Dns(c)=\mathrm{Max}\{T_1,T_2,T_3,T_4,T_5,T_6,T_C\}$$

According to Equation 7, the compensation dimming level Dns(c) of the light-emitting block B is a maximum value among the adaptation levels T1, T2, . . . , T6 and a dimming level (Tc=D(c)) of the light-emitting block B.

Figure 7A:
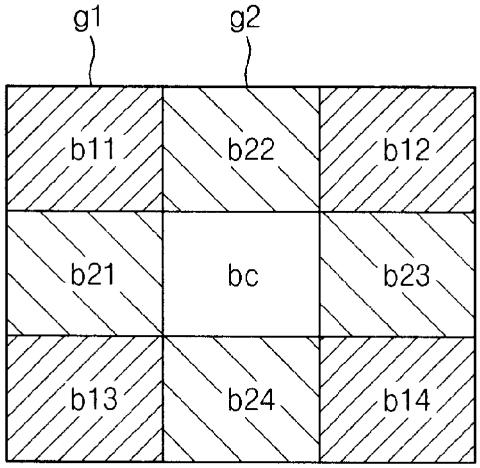
FIGS. 7A, 7B and 7C are plan views illustrating an exemplary embodiment of a nonlinear spatial algorithm using a nonlinear block window according to the present invention.
Figure 7B:
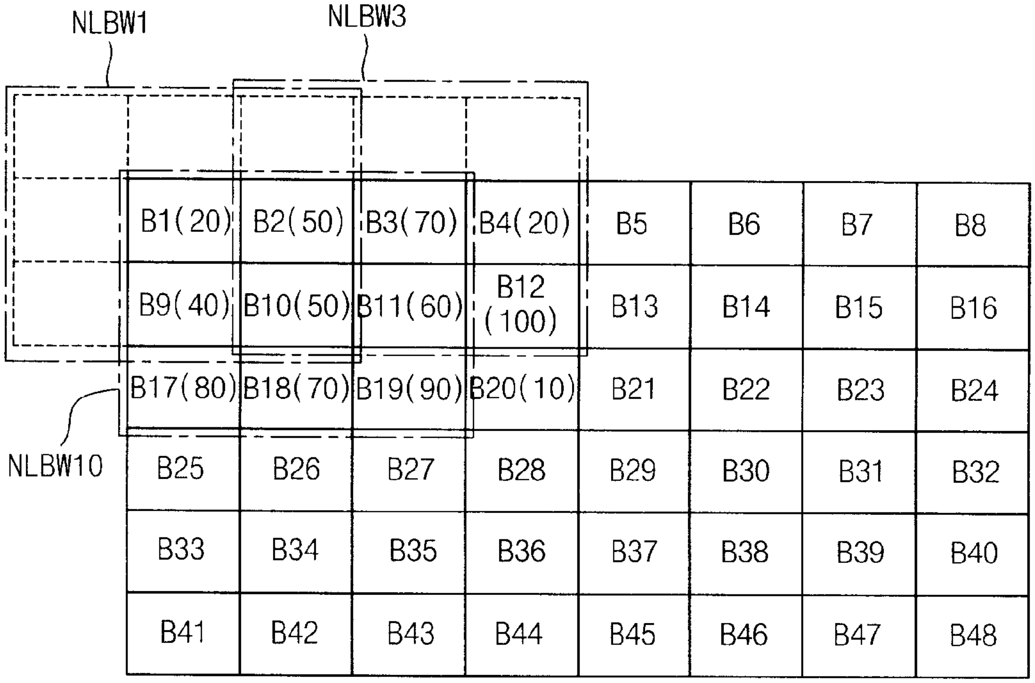
Figure 7C:
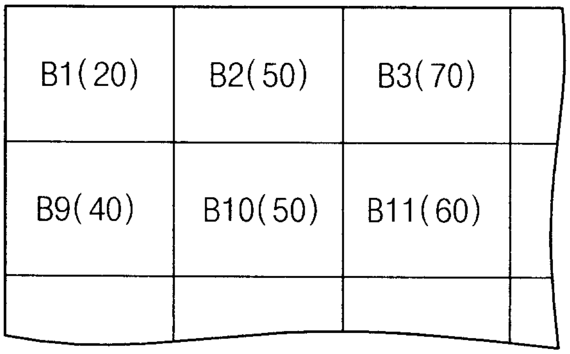

FIGS. 7A, 7B and 7C are plan views illustrating an exemplary embodiment of a nonlinear spatial algorithm using a nonlinear block window according to the present invention. In FIGS. 7A to 7C, a process for calculating compensation dimming levels of the light-emitting blocks is shown, in which a 3×3 nonlinear block window of is employed in a light source module including 8×6 light-emitting blocks B.

A light-emitting block B to be compensated is positioned at a central block bc of the 3×3 nonlinear block window, and then peripheral blocks are divided into a plurality of groups along predetermined distances from the central block bc. As shown in FIG. 7A, a size L of the nonlinear block window is 3, and the peripheral blocks may therefore be divided into a first group g1 and a second group g2. For purposes of illustration herein, a distance-weighted value w1 of the first group g1 is assumed to be 0.2, and a distance-weighted value 'w2' of the second group 'g2' is assumed to be 0.4.

Referring to FIGS. 7A to 7C, a first nonlinear block window NLBW1 is employed to calculate a compensation dimming block of a first light-emitting block B1. As shown in FIG. 7A, the first light-emitting block B1 is positioned at an outermost peripheral area of a light source module 200, and a first group for the first light-emitting block B1 includes a tenth light-emitting block B10. Similarly, a second group includes a second light-emitting group B2 and a ninth light-emitting block B9, based on the first nonlinear block window NLBW1.

According to Equation 4, an adaptation level T1 of the first group is 50×0.2=10 which a distance-weighted value w1 is employed in a dimming level of the tenth light-emitting block B10. Likewise, an adaptation level T2 of the second group is 50×0.4=20 which a distance-weighted value w2 is employed in a dimming level of the second light-emitting block B2 that is the maximum dimming level. According to Equation 5, a compensation dimming level of the first light-emitting block B1 is calculated to be 20 (e.g., the maximum among the self-dimming level Tc, and adaptation level T1 and T2 of the first and second groups, respectively).

A third nonlinear block window NLBW3 is employed to calculate a compensation dimming block of a third light-emitting block B3. In the third nonlinear block window NLBW3, a first group for the third light-emitting block B3 is tenth light-emitting block B10 and a twelfth light-emitting block B12, and a second group is a second light-emitting block B2, a fourth light-emitting block B4 and an eleventh light-emitting block B11.

According to Equation 4, an adaptation level T1 of the first group is 100×0.2=20, and a distance-weighted value w1 is employed in a dimming level of the twelfth light-emitting block B12 which is the maximum dimming level. Likewise, an adaptation level T2 of the second group is 50×0.4=20 which a distance-weighted value w2 is employed in a dimming level of the second light-emitting block B2 that is the maximum dimming level. According to Equation 5, a compensation dimming level of the third light-emitting level B3 is calculated as 70, which is the maximum value among a self-dimming level Tc and adaptation levels T1 and T2 of the first and second groups.

A tenth nonlinear block window NLBW10 is employed to calculate a compensation dimming block of a tenth light-emitting block B10. In the tenth nonlinear block window NLBW10, a first group for the tenth light-emitting block B10 is first, third, seventeenth and nineteenth light-emitting blocks B1, B3, B17 and B19, respectively, and a second group for the tenth light-emitting block B10 is ninth, second, eleventh and eighteenth light-emitting blocks B9, B2, B11 and B18, respectively.

According to Equation 4, an adaptation level T1 of the first group is 90×0.2=18 when a distance-weighted value w1 is employed in a dimming level of the nineteenth light-emitting block B19 (e.g., the maximum dimming level), and an adaptation level T2 of the second group is 70×0.4=28 which a distance-weighted value w2 is employed in a dimming level of the eighteenth light-emitting block B18, which is the maximum dimming level. According to Equation 5, a compensation dimming level of the tenth light-emitting level B10 is calculated as 50 which is the maximum value among a self-dimming level Tc and adaptation levels T1 and T2 of the first and second groups.

Thus, a compensation dimming level for a total of 48 light-emitting blocks B1, B2, . . . , B47 and B48 is calculated.

Thus, according to exemplary embodiments of the present invention as described herein, a dimming level of a light-emitting block is compensated by using dimming levels of peripheral light-emitting blocks positioned in a peripheral area with respect to the light-emitting block. A method of calculating a compensation dimming level of the light-emitting block uses a linear spatial algorithm or, alternatively, a nonlinear spatial algorithm. Thus, a brightness of a light source module including a plurality of light-emitting blocks has a spatially smooth profile, and a display quality of a display apparatus is thereby substantially enhanced.

The present invention should not be construed as being limited to the exemplary embodiments set forth herein. Rather, these exemplary embodiments are provided so that this disclosure will be thorough and complete and will fully convey the concept of the present invention to those skilled in the art. Thus, the exemplary embodiments as described herein are illustrative of the present invention and are not to be construed as limiting thereof.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A method of local dimming of a light source including a plurality of light-emitting blocks, the method comprising:

determining a dimming level of each light-emitting block of the plurality of light-emitting blocks;

calculating a compensation dimming level of a predetermined light-emitting block based on a dimming level of peripheral light-emitting blocks disposed around a periphery of the predetermined light-emitting block; and driving the predetermined light-emitting block based on the compensation dimming level, wherein an average dimming level is calculated based on an L×L block window (wherein L is a natural number), wherein a central block of the L×L block window corresponds to the predetermined light-emitting block, and the compensation dimming level Ds(c) of the predetermined light-emitting block is calculated by:

$$Ds(c) = D(c) + k(\overline{D} - D(c));\ 0 \leq k \leq 1,$$

$$\overline{D} = \frac{\sum_{i=1, i \neq c}^{L \times L} D(i)}{(L \times L) - 1}$$

where D(c) represents a compensation dimming level of the predetermined light-emitting block, and $\overline{D}$ represents an average dimming level of peripheral blocks of the central block.

2. The method of claim 1, wherein the calculating the compensation dimming level of the predetermined light-emitting block further comprises using a dimming level of the predetermined light-emitting block employed in a previous frame.

3. The method of claim 1, wherein the calculating the compensation dimming level of the predetermined light-emitting block further comprises employing a distance-weighted value based on an interval distance between the peripheral light-emitting blocks.

4. The method of claim 3, wherein distance-weighted value increases as the interval distance decreases.

5. The method of claim 4, wherein the calculating the compensation dimming level further comprises:

dividing the peripheral light-emitting blocks into a plurality of groups based on a location of the predetermined light-emitting block and the interval distance by employing an L×L block window (wherein L is a natural number) and calculating adaptation levels of groups of the plurality of groups based on a predetermined maximum value of the adaptation level and a dimming level of the predetermined light-emitting block.

6. The method of claim 5, wherein the predetermined light-emitting block corresponds to a central block of the L×L block window, the peripheral light-emitting blocks are divided into q groups (wherein q is a natural number), and the adaptation levels of the groups are calculated by:

$$T_1=\omega_1 \times D(g_1)\max,$$

$$T_2=\omega_2 \times D(g_2)\max,$$

$$\ldots$$

$$T_Q=\omega_Q \times D(g_Q)\max,$$

$$Tc=D(c)$$

where D(g1)max represents a maximum dimming level of light-emitting blocks corresponding to a first group g1, D(g2)max represents a maximum dimming level of light-emitting blocks corresponding to a second group g2, D(gq)max represents a maximum dimming level of light-emitting blocks corresponding to a (q)-th group gq, w1, w2, . . . , wq represent distance-weighted values defined as 0<w1<w2< . . . wq<1, and Tc represents a dimming level of the predetermined light-emitting block.

7. The method of claim 6, wherein an adaptation dimming level Dns(c) of the predetermined block is defined by:

$$Dns(c)=\mathrm{Max}\{T_1, T_2, \ldots, T_Q, T_C\}.$$

8. A light source apparatus comprising:

a light source module comprising a plurality of light-emitting blocks; and a local dimming driving part which determines a dimming level of each light-emitting block of the plurality of light-emitting blocks, which calculates a compensation dimming level of a predetermined light-emitting block based on dimming levels of peripheral light-emitting blocks disposed around a periphery of the predetermined light-emitting block, and which drives the predetermined light-emitting block based on the compensation dimming level, wherein an average dimming level is calculated based on an L×L block window (wherein L is a natural number), wherein a central block of the L×L block window corresponds to the predetermined light-emitting block, and the compensation dimming level Ds(c) of the predetermined light-emitting block is calculated by:

$$Ds(c) = D(c) + k(\overline{D} - D(c));\ 0 \leq k \leq 1,$$

$$\overline{D} = \frac{\sum_{i=1, i \neq c}^{L \times L} D(i)}{(L \times L) - 1}$$

where D(c) represents a compensation dimming level of the predetermined light-emitting block, and $\overline{D}$ represents an average dimming level of peripheral blocks of the central block.

9. The light source apparatus of claim 8, wherein the local dimming driving part comprises:

an image analyzing part which extracts a representative luminance value of the predetermined light-emitting block by analyzing an image signal corresponding to the predetermined light-emitting block;

a dimming level determining part which determines a dimming level which controls a brightness of the predetermined light-emitting block based on the representative luminance value;

a spatial compensating part which calculates the compensation dimming level of the predetermined light-emitting block based on the dimming levels of the peripheral light-emitting blocks; and a light-emitting driving part which drives the predetermined light-emitting block based on the compensation dimming level.

10. The light source apparatus of claim 9, further comprising:

a temporal compensating part which calculates the compensation dimming level of the predetermined light-emitting block based on a dimming level of the predetermined light-emitting block employed in a previous frame.

11. The light source apparatus of claim 9, wherein the spatial compensating part calculates the compensation dimming level based on a dimming level of the predetermined light-emitting block and the average dimming level of the peripheral light-emitting blocks.

12. The light source apparatus of claim 9, wherein the spatial compensating part calculates a dimming level of the predetermined light-emitting block and the compensation dimming level, the spatial compensating part divides the peripheral light-emitting blocks into a plurality of groups based on an interval distance from the predetermined light-emitting block, and spatial compensating part calculates the compensation dimming level based on adaptation levels of groups of the plurality of groups based on a distance-weighted value and a maximum dimming level of the groups.

13. The light source apparatus of claim 12, wherein the distance-weighted value increases as the interval distance decreases.

14. A display apparatus comprising:

a display panel comprising a plurality of display blocks to display images on the display panel;

a light source module comprising a plurality of light-emitting blocks, each light-emitting block of the plurality of light-emitting blocks corresponding to a display block of the plurality of display blocks, and each light-emitting block comprising a plurality of light-emitting diodes; and a local dimming driving part which determines a dimming level of each light-emitting block of the plurality of light-emitting blocks, which calculates a compensation dimming level of a predetermined light-emitting block based on dimming levels of peripheral light-emitting blocks disposed around a periphery of the predetermined light-emitting block, and which drives the predetermined light-emitting block based on the compensation dimming level, wherein an average dimming level is calculated based on an L×L block window (wherein L is a natural number), wherein a central block of the L×L block window corresponds to the predetermined light-emitting block, and the compensation dimming level Ds(c) of the predetermined light-emitting block is calculated by:

$$Ds(c) = D(c) + k(\overline{D} - D(c));\ 0 \le k \le 1,$$

$$\overline{D} = \frac{\sum_{i=1, i \ne c}^{L \times L} D(i)}{(L \times L) - 1}$$

where D(c) represents a compensation dimming level of the predetermined, light-emitting block, and $\overline{D}$ represents an average dimming level of peripheral blocks of the central block.

15. The display apparatus of claim 14, wherein the local dimming driving part comprises:

an image analyzing part which extracts a representative luminance value of the predetermined light-emitting block by analyzing an image signal corresponding to the predetermined light-emitting block;

a dimming level determining part which determines a dimming level which controls a brightness of the predetermined light-emitting block based on the representative luminance value;

a spatial compensating part which calculates the compensation dimming level of the predetermined light-emitting block based on the dimming levels of the peripheral light-emitting blocks; and a light-emitting driving part which drives the predetermined light-emitting block based on the compensation dimming level.

16. The display apparatus of claim 15, wherein the spatial compensating part calculates the compensation dimming level based on a dimming level of the predetermined light-emitting block and the average dimming level of the peripheral light-emitting blocks.

17. The display apparatus of claim 16, wherein the spatial compensating part calculates the dimming level of the predetermined light-emitting block and the compensation dimming level, the spatial compensating part divides the peripheral light-emitting blocks into a plurality of groups based on an interval distance from the predetermined light-emitting block, and the spatial compensating part calculates the compensation dimming level based on adaptation levels of groups of the plurality of groups based on a distance-weighted value and a maximum dimming level of the groups.

18. The display apparatus of claim 17, wherein the distance-weighted value increases as the interval distance decreases.

* * * * *